United States Patent
Alhadef (10) Patent No.: US 8,009,198 B2
(45) Date of Patent: Aug. 30, 2011

(54) SYSTEM FOR THE TRACKING AND MOTION CONTROL OF A PROFESSIONAL VIDEO CAMERA PERMITTING THE COMBINATION OF BOTH REAL AND VITUAL IMAGES

(76) Inventor: Laurent Alhadef, Paris (FR)

( * ) Notice: Subject to any disclaimer, the term of this patent is extended or adjusted under 35 U.S.C. 154(b) by 1459 days.

(21) Appl. No.: 10/553,885

(22) PCT Filed: Apr. 22, 2004

(86) PCT No.: PCT/FR2004/000982
§ 371 (c)(1),
(2), (4) Date: Oct. 19, 2005

(87) PCT Pub. No.: WO2004/098176
PCT Pub. Date: Nov. 11, 2004

(65) Prior Publication Data
US 2006/0221187 A1 Oct. 5, 2006

(30) Foreign Application Priority Data
Apr. 24, 2003 (FR) ..................... 03 05068

(51) Int. Cl.
*H04N 5/228* (2006.01)
(52) U.S. Cl. ............................... 348/208.99
(58) Field of Classification Search ............ 348/49, 348/50
See application file for complete search history.

(56) References Cited

U.S. PATENT DOCUMENTS

| | | | | |
|---|---|---|---|---|
| 5,262,867 A * | 11/1993 | Kojima | ........................ | 348/39 |
| 5,913,078 A * | 6/1999 | Kimura et al. | .................. | 396/50 |
| 6,282,362 B1 * | 8/2001 | Murphy et al. | .................. | 386/46 |
| 7,187,401 B2 * | 3/2007 | Alhadef et al. | ................. | 348/42 |
| 7,477,295 B2 * | 1/2009 | Tanaka | ........................ | 348/231.3 |

* cited by examiner

*Primary Examiner* — Luong T Nguyen (57) ABSTRACT

A system for acquiring and transmitting, in real time, data representing the position in space, in terms of spatial coordinates and inclination with respect to a reference point, of a video camera, while the camera moves along a trajectory. The acquired data thus acquired, once processed, permit determination of the position and inclination of the images obtained. The system consists of two principal subsystems: a module containing an inertial sensing unit to be attached to the camera and a module for data processing using stored software programs communicating with the inertial sensing unit via a connection either wired or wireless. It has applications in the integration of images captured by the camera with images from other sources and in navigation within a virtual universe.

10 Claims, 2 Drawing Sheets

SYSTEM FOR THE TRACKING AND MOTION CONTROL OF A PROFESSIONAL VIDEO CAMERA PERMITTING THE COMBINATION OF BOTH REAL AND VITUAL IMAGES

A system for the transmission of data describing the position in space of a video camera in motion; specifically it is a system for transmitting its spatial coordinates, in real time.

By so doing, it permits the determination of spatial coordinates for the focal plane of video images.

Such a process is generally known by the terms "motion control" or "tracking camera".

The invention also concerns a system for the implementation of this process.

Within the context of this invention, the term "coordinates" should be understood in a very general sense. In this general sense of the term, the coordinates of the focal plane of an image are determined by: the inclination of the focal plane in space, the angle of the azimuth (yaw), the degree of elevation (pitch), and the extent of roll, as well as the position of the center of the image. This center point is defined by three spatial coordinates, arbitrarily termed x, y and z, on an orthonormal trihedron with axes X, Y and Z.

This system finds most interesting, albeit not exclusive, applications in two principal fields:
the characterization of images within a video stream with respect to the position in space of their focal planes;
the determination, in real time, of the field of view of a video camera moving within a virtual decor.

FIRST FIELD OF APPLICATION

In the film special effects industry, it is often necessary to imbed images from other sources (other films, models, virtual images . . . ) within images filmed with a camera in motion. By knowing, with precision, the coordinates in space of each focal plane and the focal length used, it becomes a simple matter to prepare other images, whose coordinates are also known, for imbedding. The coordiates of an image's focal plane are, as given above, the inclination of the focal plane in space (given by the angles of azimuth, elevation and roll), as well as the position of the center of the image (coordinates x, y, z). This is particularly applicable to the imbedding of virtual images in a film.

SECOND FIELD OF APPLICATION

More and more, the decor of a film is composed, entirely or in part, of virtual images. Thus, it now becomes difficult, under certain conditions, to determine the framing of a video camera precisely, especially when it is in motion. In that case, it becomes necessary to visualize, in real time, an outline of the framing of the camera within a three-dimensional virtual decor. The three-dimensional decor is modeled first. When the spatial positions of the camera and the focal distance are known, in real time, the virtual image of the framing is reconstructed by a computer program for redering it three dimensional, in real time.

A previously issued patent by the same inventor, patent No.: U.S. Pat. No. 7,187,401, entitled "SYSTEM AND A METHOD OF THREE-DIMENSIONAL MODELING AND RESTITUTION OF AN OBJECT" also makes reference to a system for the transmission of data describing the position in space of a video camera in motion by using an inertial control unit. However, the presently described device is different in several ways:

the primary function of the previously patented process is to provide a three dimensional model of an object, whereas the main function of the system described in the present application is to enable permit the facile imbedding of virtual images onto real images, for use within a film, while using a light and highly mobile (shoulder-held) camera.

the system previously patented is integrated into camera specially designed for that purpose, whereas the present system is attached to a previously existing camera, usually a professional video camera.

the methods of data analysis are quite different. The previously patented device processes the data using a free-standing computer containing photogrammetric software in order to obtain a three dimensional model of the scene. On the other hand, in the present device, data analysis is performed utilizing software often referred to as "compositing programs" which enables the imbedding of images from other sources (other films, models, virtual images, etc.) onto images filmed with a camera in motion.

At the present, there exist a certain number of processes and systems which are intended to respond to needs of this type, processes and systems which may be divided into two principal categories.

First of all, there are processes associated with systems involving video cameras mounted upon robots or upon articulated arms. With these types of systems, it is certainly possible to achieve good precision. On the other hand, relatively numerous drawbacks are usually encountered, which one may summarize as follows: the apparatus is heavy and difficult to transport; it has a limited operating range; its cost is high and the system is best reserved for specialists, since its operation is complicated.

There are also techniques and systems for image processing which rely upon tracking a series of "remarkable" points. These processes make use of specialized software. Once the film has been digitalized, certain "remarkable points" are selected in a particular image of the film. These same points are then identified in each subsequent image by using a software method known as "point tracking" (ie, "the following of specific points"). An image processing algorithm then enables the software to determine the position of the focal plane of each image. The main advantage of this method is that establishing the field of view is quick and easy. By way of software examples, one may cite "3D Equalizer" of the Techimage company and "MatchMover" (registered trade mark) made by Realvitz.

Nonetheless, the drawbacks of this process are numerous: image processing is long and costly; the processing of sequences lasting less than a minute may take weeks.
frequent manual interventions are required
the accuracy is mediocre
the images must be sharply contrasted; for example, the process is practically impossible in the case of images with fog, rain or dim lighting.
the images must be sharp; a hazy effect perturbs the quality of the measurements, as, for example, when the diaphragm of the objective is open widely, which diminishes the depth of field.
in the presence of errors engendered by the optics; these aberations perturb the quality of the measurements (chromatic aberration, coma, astigmatism, field curvature, distortion, etc.).
systems for image compression also impair the quality of the measurements.

because the method for calculating the position of the of the images is different, it is impossible to apply this technique to the visualization of decor in real time; and finally the necessity of using optical targets when the image offers little contrast, as, for example, in a film with a blue background.

The invention seeks to mitigate the drawbacks of existing state of the art systems and methods, some of which have been outlined above.

The invention proposes a process for transmitting, in real time, the spatial coordinates of a moving video camera.

The invention also proposes a system for the implementation of this process.

The system, as a whole, takes the form of a light-weight apparatus to which a video camera is attached.

More precisely, it consists of a light, mobile and autonomous system, which permits, if the focal distance is known, the control of a video camera, in such a way as to facilitate the imbedding of other images into the images being filmed. It may be used as a pointer to allow the visualization, along the axis of the camera, of a virtual three-dimensional decor.

The invention consists, essentially, of two principal subsystems:

The first subsystem is intended to be integrated with a video camera. It consists of a rigid shell, in which an inertial sensing unit and its electronics are housed.

The second subsystem, which can easily be carried in a pack by the operator, is designed to process the data from the first system and to supply power to the entire system. It includes:

a battery, or other power source, to provide electric power to the system, in its entirety, and a light-weight electronic console, connected to the output of the inertial sensing unit, which records the data concerning the position in space of the video camera at a predetermined frequency, typically 100 Hz.

The data recorded by the electronic console are indexed with respect to time.

The data may be transmitted directly by cable or by wireless technology to a supplementary computerized data processing unit, containing software for navigation within a 3D model, so that the data can be processed in real time or quasi-real time. The preferable method for accomplishing this is to place the data processing unit in a back pack, or other similar device, which is carried by the operator.

To improve the quality and precision of the measurements, supplementary components may be added to one or the other of the two subsystems.

As a result of the processes and systems of the invention, the precision of the measurements is independent of the quality of the images. In addition, transmission of the positional coordinates is carried out in real time.

The invention, then, has as its principal objective a process for the transmission of positional coordinates of a viewing device for a sequence of video images, moving in space along a trajectory defined with respect to a predetermined reference standard, characterized by means of at least the following steps:

a preliminary step consisting of attaching the above mentioned viewing device to the initial subsystem, which includes an inertial sensing unit delivering signals representing the special coordinates and the instantaneous inclination of the said viewing device with respect to the above mentioned reference standard;

an initial step of data acquisition, in real time, of the said data signals during the displacement of the said viewing device along the above mentioned trajectory and of their transmission to a second subsystem which has the ability to process the data employing a prerecorded software program, and a second step of processing the said data, either in real time and/or differed for subsequent analysis, in a manner so as to determine the said positional coordinates.

Another objective of the invention is the application of this process to the characterization of the images of a video stream with respect to the position of its focal plane in space.

Another objective of the invention is the application of this process to the visualization, in real time, of the framing outline of a video camera within a virtual decor.

Finally, another object of the invention is to provide a system for transmitting, in real time, the positional coordinates, within space, of a moving video camera.

The invention will now be described in a more detailed fashion by referring to the attached drawings.

First, we will describe examples of the system for transmitting, in real time, the coordinates of the position within space of a video camera in motion according to each of the two methods of using the invention, referring to FIGS. 1A through 3.

In these figures, identical elements bear the same reference numbers and will not be described again, except as needed.

Figures 1A, 1B, 1D:
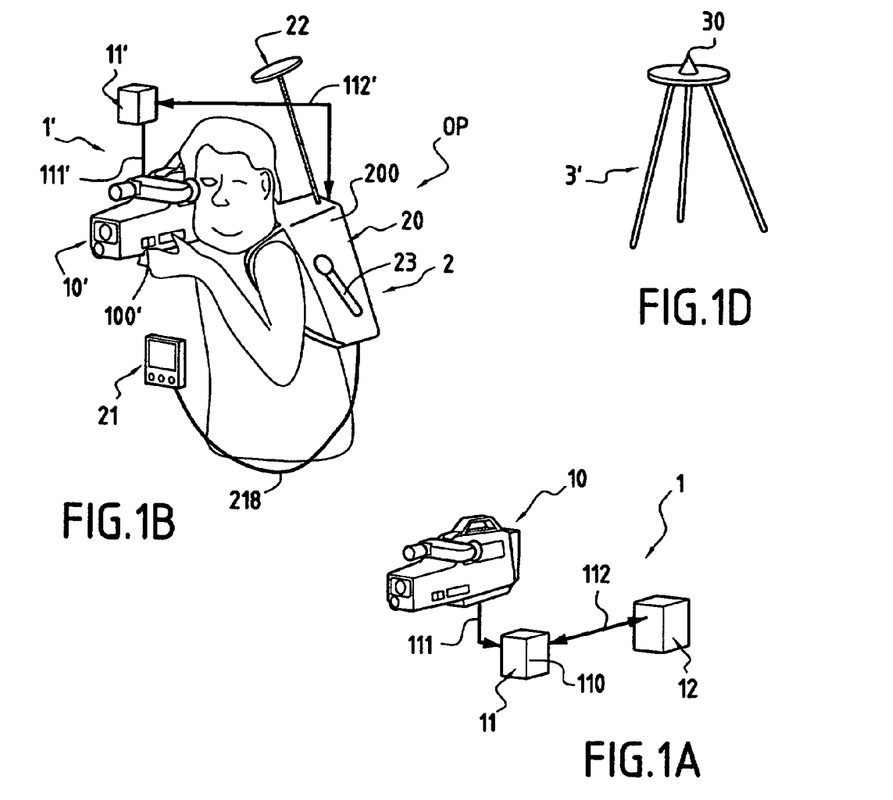
FIG. 1A illustrates schematically an example of the system for transmitting and processing the data defining the position within space of a viewing device for a sequence of video images, according to one method of using the invention.
FIGS. 1B through 1D illustrate schematically an example of the system for transmitting and processing the data defining the position within space of a viewing device for a sequence of video images, according to a second method of using the invention.

In FIG. 1A, we have represented an initial system (system 1), which one might describe as "minimalist".

This system 1 includes one video camera. In effect, the process, using the invention, as will be shown, permits disassociating the image quality from the precision of the measurements furnished by the system. In other terms, a high precision of measurement may be obtained even when the images are of poor quality. Therefore, the system is not sensitive to conditions such as weak lighting, haziness, etc.

Using the invention, the system for transmitting, in real time, the spacial coordinates of a video camera (10) in motion consists, as has been described above, of two principal subsystems:

The first subsystem (11) includes an inertial sensing unit and its electronics (not specifially shown in the drawing). It consists of a rigid shell (110), in which the inertial sensing unit and its electronics are housed. This shell is intended to be attached to the video camera (10) by any appropriate method of fixation, permanent or adjustable (ties, screws, etc.), symbolized by reference 111.

The second subsystem is a storage component (12) which can be conveniently carried in a pack by the operator (not shown in FIG. 1A). This storage unit (12) is designed to process the information provided by the first subsystem (11). In addition, it supplies power to system 1 in its entirety.

More precisely, the second subsystem (12) includes:
a battery, or any other equivalent device (not shown) for providing electric power, and
a light-weight electronics console, connected to the output of the inertial sensing unit, which records the data concerning the position in space of the video camera (10), via the frame (11) which is attached to it, at a frequency typically in the range of 100 hertz (Hz).

The data are transmitted to the second subsystem (12) via a connection (112), wired or winreless (electromagnetic waves, etc.). It should be noted that this connection (112) may be bidirectional, in which case a wired type of connection is used, in series or in parallel.

FIG. 1B illustrates an example of a system transmitting, in real time, the special coordinates of a moving video camera, employing a second method of utilizing the invention, which one might describe as "complete". This system will hereafter be referred to as system 1'.

The video camera and first subsystem may be identical to those depicted in FIG. 1A. Nevertheless, the video camera and the first subsystem will hereafter be indicated by 10' and 11', since one or the other may be "completed" by the addition of certain modules which will be described later. The first subsystem (11'), as previously, is coupled to a video camera by any appropriate method (indicated in the drawing by 111').

A fundamental difference between the first and second methods of operation relates to the fact that the data generated by the first subsystem (11') are transmitted directly to a data processing unit (reference 20) containing a stored software program. The latter may be easily placed in a back-pack (200), or other similar device, carried by the operator (OP).

Figure 1C:
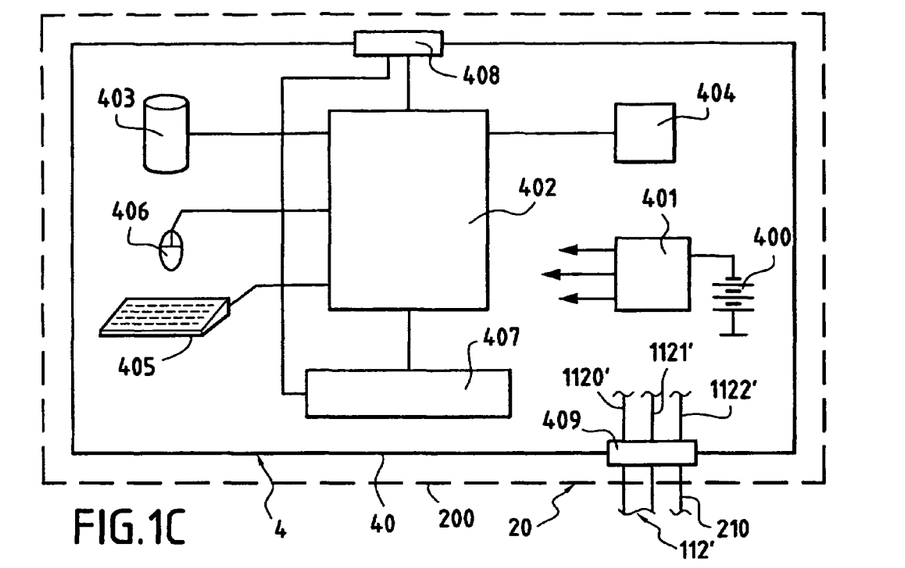

FIG. 1C illustrates schematically one possible configuration of the system for data processing (20), in the form, for example, of a micro-computer (4), placed in a back-pack (200) and communicating with the first subsystem (11') via connections (112') similar in type, if not identical, to those shown in FIG. 1A.

The micro-computer (4) consists of a group of modules and circuits mounted on a chassis (40). The principal modules and circuits of the micro-computer (4) are the following:

- a battery for providing electric power, for example a lithium battery of 12 volts and 10 ampere hours, with an associated power chopping unit, so as to avoid using heavy transformers (401); the power supply furnishes a range of output voltages and currants, of appropriate amplitutudes, to the other components; it is indicated by the general reference VS;
- a digital data processing unit using stored software programs, shown as 402, including the various classical computer components (not shown) such as microprocessor, random access memory (RAM), etc. and, most notably, a video card, preferably of the 3D type;
- a large hard drive memory unit (403), consisting, for example, of two magnetic discs, each having a capacity of 80 gigaoctets (Go);
- a display unit (404), receiving signals from the 3D video card, mentioned above;
- data entry devices such as a keyboard (405) and a pointing device (406), mouse, ball, etc., for inputting comments, additional data, as well as instructions for synchronization and/or for data processing;
- electronic circuits (407) for processing the signals generated by the first subsystem (11', FIG. 1B), interfacing with the digital data processing unit (402) by means of a suitable electronic circuit card (for example, a serial port); and
- input and output ports for handling various protocols, as well as electronic circuits for interfacing with external devices, such as "IEEE 1394" or "firewire", "USB", VGA", video, sound, "bluetooth", "Ethernet", "wireless", "802.11", etc., which are grouped together under the single reference 408.

Connectors (409) are also evisaged for linking the micro-computer, by cable (112', FIG. 1B), to the primary subsystem (11'). A priori, the cable will carry signals of several types: electronic signals carried over wires (1120'), (a serial bus, for example, or the like), electric power supply signals (1121') and optical signals carried over optical fibers, for example from the optical fiber gyrometers housed in the first subsystem (11'). A corresponding connector (not shown) is envisaged within that subsystem (11'). Naturally, other types of linkages could be provided, as well, such as radio links (for example, using the "bluetooth" technology, mentioned above) and direct optical links (signals modulating an infrared carrier, for example) between the first subsystem (11') and various elements of the micro-computer (4).

In place of the data entry units 405 and 406, or in addition to them, one could use a PDA (Personal Digital Assistant). This PDA would be linked to the micro-computer (4) by a cable (210) going to, for example, the connector indicated by reference 409.

Preferably, the circuits (421) would feed, through the linkages (1121') to the connector 409, all of system 1', that is to say, the first subsystem (11'), and the video camera (10'), as well.

In order to improve the measurements obtained and/or to provide greater facility of data processing, one could expand and/or modify one or both of the first and second subsystems (11' and 2, respectively).

In order to improve the accuracy of determining the localization coordinates of the video camera (10'), one might add one or more of the following modules, located in the video camera (10'), the first subsystem (11') and/or the second subsystem (2):

- a gyrometer consisting of three orthogonal bobbins of monomodal optic fibers (for example, using bobbins 80 mm in diameter, each one containing 1000 meters of optic fiber);
- a tri-flux rotary magnetometer;
- two inclinometers, orthogonal with respect to the principal plane of the apparatus, that is to say, of the video camera (10');
- a satellite localization system (22) of the GPS (Global Positioning System) type or, in the near future, of the type called "GALILLEO", which would provide more precise localization data, would measure the variations in localization and would correct for inertial components; this unit (22) would communicate with the appropriate processing circuits (not shown on FIG. 1C), housed in the chassis (40) of the micro-computer (4);
- an electronic localization unit (using electromagnetic or electrostatic fields) to measure variations in localization and to correct for inertial components;
- implement a magnetometer, of a single or several fluxes, static or dynamic (for example rotary, in order to eliminate parasite components), in order to measure variations in localization, essentially with respect to the earth's magnetic field, and to correct for inertial components;
- an odometer to measure variations of localization and to correct for inertial components;
- an electronic system giving the operator and the entire system an estimate of the drift of the localization units, in real time;
- a trihedron of three ultrasound emitters to generate information on the localization of the video camera (10'); and/or a temperature sensor to improve the accuracy of data from the inertial sensing unit.

To provide optimum data synchronization between the sequences of images captured by the video camera (10'), one could install a high precision quartz timer.

One could also install a small, auxiliary on-board camera, coupled to the main video camera (10'). The stream of images from this auxiliary camera, even though of poor quality, if integrated with the various methods for localization of the main video camera (10'), would facilitate the synchronization of the stream of images, of superior quality, obtained by the primary video camera (10') with its localization measurements.

One might also add a microphone (23) to the second subsystem (2) to capture the comments of the operator (OP) and/or the synchronization beeps, in order to facilitate the editing of the video images and make the editing more secure.

Finally, one could utilize an initialization terminal (3), which establishes the initial starting point of the camera, and is schematically illustrated in FIG. 1D. The video camera (10') is placed in a housing (30), which defines the camera's original starting point for the movement and localization sensors located in the first subsystem (11').

It is certainly possible to make use of a more elaborate video camera than the one described heretofore, particularly with respect to devices called "man-machine interfaces". In particular, the video camera (10') might be provided with:
  push-buttons;
  two rotary knobs, used to regulate the speed of image acquisition and the identification of "remarkable points"; and/or
  a viewing screen, preferably of the Liquid Crystal Display (LCD) type, with a resolution of 400×300 pixels, for example.

One might also provide the operator (OP) with "virtual goggles", which could replace the screen of the video camera (10').

In both configurations that have just been described, (FIG. 1A, for the first, and FIGS. 1B through 1D, for the second), the first subsystem (11 and 11', respectively) is made up of at least the basic devices for instantaneously monitoring position and speed by inertial methods (i.e., gyrometers and accelerometers).

The first subsystem (11 or 11') is attached to a video camera (10 or 10'). This system, as conceived by the invention, allows one to effect what has previously been called "motion control". The invention will find application, as will be shown, in two large areas of acitivity: the characterization of images, within a video stream, with respect to the position of their focal plane in space and the visualization, in real time, of the framing outline of a video camera (10 or 10') within a virtual decor.

These operations assume that one is able to determine, at each point in time, a certain number of parameters related to the the image perceived within the viewfinder, notably the spatial coordinates of the video camera (10 or 10') with respect to a reference point and the focal length utilized.

Figure 2:
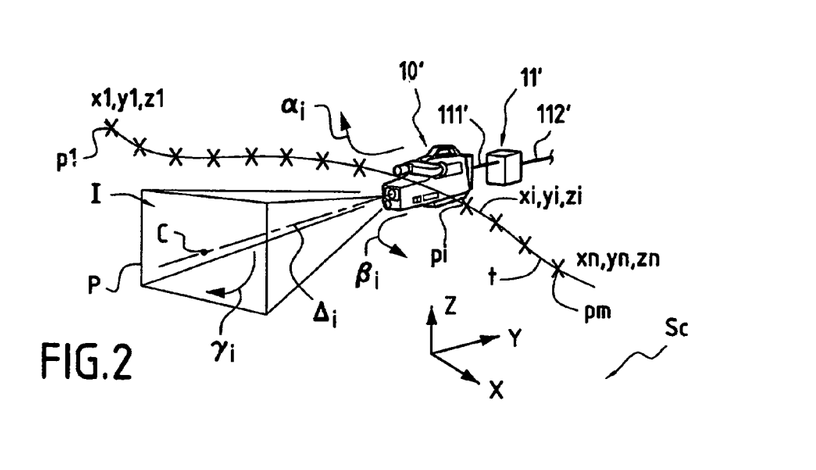
FIG. 2 illustrates schematically an operating modality which permits the acquisition of the coordinates, in three dimensions, of the focal plane of an image, with respect to an orthonormal trihedron of reference related to a scene.

FIG. 2 illustrates schematically the method of operation which permits acquisition of the coordinates, in three dimensions, $x_n$, $y_n$, and $z_n$, of the focal plane (FP) of an image (I), with respect to an orthonormal trihrdron of reference, XYZ, related to a scene (SC).

One must refer, again, to the second method of operation, depicted on FIGS. 1B through 1D, understanding that all that will be discussed applies equally to the first method of operation (FIG. 1A). One assumes that the axis ($\Delta_i$) of the video camera (10') intersects the focal plane (FP) of the image (I) at its center (C). The video camera (10') follows a given trajectory (t), causing it to pass, for example, from one point ($p_1$) with initial coordinates $x_1$, $y_1$ and $z_1$ to another point ($p_n$) with final coordinates, $x_n$, $y_n$ and $z_n$, while passing through an intermediate point ($p_i$) with instantaneous coordinates $x_i$, $y_i$ and $z_i$. The velocity and the instantaious acceleration of the video camera (10') may be of any magnitude and may vary along the trajectory (t). At each point, one may define, besides the instantaneous coordinates $x_i$, $y_i$ et $z_i$, with respect to the reference trihedron XYZ, three series of values for instantaneous inclination, characterized by the three angles, called angles of elevation, ($\alpha_i$,), azimuth ($\beta_i$,) and roll ($\gamma_i$) of the axis ($\Delta_i$), with respect to the same reference trihedron XYZ.

Once the first subsystem (11') has been attached to the video camera (10'), it follows the latter's movements at the same velocity and also follows its inclination, as defined by the angles of elevation, ($\alpha_i$,), azimuth, ($\beta_i$) and roll ($\gamma_i$). The measuring devices based on sensors of position and instantaneous velocity of an inertial nature, housed in the second subsystem (11'), can then generate data concerning its position (spatial coordinates), instantaneous velocity and inclination throughout the camera's course of motion. The transmission of these data is carried out using the linkage #112, typically at a frequency of 100 Hz. These data are recorded by the data processing unit (4) for later analysis and/or processed in real time or quasi-real time, preferably followed by a recording of the results of analysis, to be reserved for later use.

Other parameters may also be followed, such as the focal point used for each of the various views.

As has already been mentioned, initial standardization of the measuring devices housed in the first subsystem may be accomplished by placing the video camera (10') in the housing (30) of the initialization terminal, at a predetermined area of the scene (SC), for example at coordinates $x_1$, $y_1$ and $z_1$. In this case, one can obtain absolute measurements. If not, in orther words, without the initialization step, the data generated will represent relative measurements.

Figure 3:
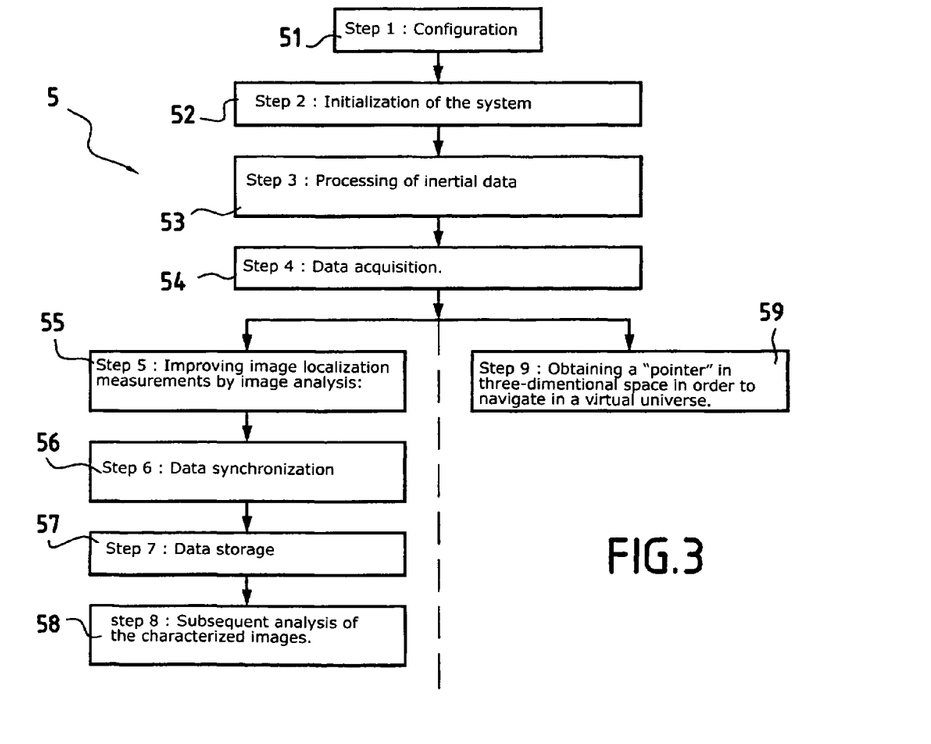
FIG. 3 consists of a block diagram describing the principal steps of the process according to each of the two methods of using the invention.

We will now describe the principal steps for the first method of using the invention, by referring to block diagram 5 on FIG. 3. We will also refer, as necessary, to the second method of utilization and to references appearing on FIGS. 1B through 2.

Step 1 (block 51): This is a preliminary step involving the configuration of the system.

First of all, one attaches the video camera (10') to the first subsystem (11'). The first subsystem (11') is solidly attached to the video camera by means of a special screw or by any other suitable mechanism (111'). Preferentially, this fixation of the camera to the first subsystem (11') is accomplished via the screw threading intended to receive the base of the camera (10').

A configuration description is included in the second subsystem (2) in the form of a text file on system configuration. Information relative to the hardware and software used is also provided in this file. Certain parameters may be reconfigured at this step.

Later on, as data is being progressively acquired, the models for predicting the behavior of the inertial sensors may be refined by applying procedures for algorithmic processing of the data.

Step 2 (block 52): Initialization of the system.

Before beginning to film, it is desireable to initialize the inertial sensing unit, located within the first subsystem (11'). The position of the video camera (10') at the time of this initialization procedure then becomes the point of origin, based on which all subsequent movements are calculated. The position measurements are, then, measured relative to that starting point.

As needed, if determining the position of the video camera using absolute coordinates becomes necessary (for example, for greater ease in imbedding a synthesized image or for the superimposition of successive fields), it is sufficient to know the coordinates of the point of initialization. To know the position of this point in reference to terrestrial coordinates, it is relatively quick and easy to use a GPS module (22), or any other appropriate technique, notably those known as "geometric".

Step 3 (block 53): processing of inertial data

This step allows one to analyse the localization data, in real time, and to determine the motion of the video camera (10') (including its inclination).

The position of the video camera (10') is determined by a localization system of the inertial navigation type, essentially based on the use of gyrometers and accelerometers contained within the first subsystem (11').

These principles are well known and are described in the following artcles:

"Inertial navigation system analysis", by K. R. Britting, published by Wiley-Interscience, New York, '1971); and "Inertial navigation systems", by C. Broxmeyer, published by McGraw Hill, New York, (1964).

After a predetermined lapse of time, it is usually necessary to recalibrate the system using the initialization terminal (3), which serves as the point of reference. The measurement differences with respect to this reference point are determined. These differences are then uniformly distributed over the prior localization measurements, so as to compensate for measurement errors.

One may also use other sensors of position and distance, such as those which have been previously mentioned: GPS, magnetometers, inclinometers and entry odometers. These sensors permit redundant determinations and, thereby, improve the accuracy of the measurements.

The estimated drift of the position measuring sensors of the apparatus may also be transmitted to the operator (OP).

These measurements are also corrected by image processing.

This type of processing is well known and have been well described in the following articles:

El-Sheimy N. Shwarz, K. P, "Integrating Differential GPS with an inertial navigation system (INS) and CCD Cameras for a Mobile GIS Data Collection System." Proceedings of the Canadian Conference on GIS", Ottawa, Canada, Jun. 6-10, 1994, pp. 241-248;

Abdulah Q., "Evaluation of GPS-Inertial Navigation System for Airborne Photogrammetry", ASPRS/MAPPS Softcopy Conference", Arlington, Va., Jul. 27-30, 1997; and Skaloud J., Cramer M., Schwarz K. P., "Exterior Orientation By Direct Measurement of Camera Position and Attitude", XVIIth ISPRS Congress", Vienna, Austria, Jul. 9-19, 1996, International Archives of Photogrammetry and Remote Sensing, vol 31, part b3, pp 125-130, 1996;

The inclination of the video camera (10'), i.e., angles of elevation, $\alpha_i$, azimuth, $\beta_i$, and roll, $\gamma_i$), and consequently the inclination in space of the focal plane (FP) of the image (I), is defined primarily by a trihedron of three gyrometers placed along three distinct, non-coplanar axes and located in the first subsystem (11').

The elctronics associated with the three gyrometric sensors deliver data on the incremental rotations $\Delta\alpha$, $\Delta\beta$ and $\Delta\gamma$ about the three axes. On the basis of these increments, the angular positions $\theta_x$, $\theta_y$, and $\theta_z$ are calculated by changing the frame of reference using arithmetical computations known as "quaternions".

The instantaneous position (coordinates $x_i$, $y_i$ and $z_i$,) of the images captured by the video camera (10') and consequently the position of the center (C) of the image (I) is primarily provided by the three accelerometers.

The distances traveled along each of the three axes ($x_i$, $y_i$ and $z_i$,) are calculated by successive integrations making use of calculations of dynamics based on the acceleration data supplied by the trihedron of three accelerometers.

The accelerometers and the gyrometers cooperate to calculate the data localizing the video camera (10'), typically at a frequency of 100 Hz, as mentioned above.

The movements of the video camera (10') are calculated continuously by means of established numeric integration algorithms (for example, of the "predictor-corrector" type, such as "Range Kutta" and "Adam"), in order to interpolate intermediate points.

Factors related to the earth, influencing the position measurements, must also be integrated into the calculations.

In fact, it is generally necessary to take two factors into account when calculating motion within a Euclidean frame of reference. The two factors are, firstly, the roundness of the earth and, secondly, its velocity of rotation.

In order to compensate for errors due to the roundness of the earth, one usually uses a gyrometric correction, so as to take account of the earth's curvature during translational movements.

In order to adjust for drift due to the acceleration of the earth, it is necessary to integrate latitude and velocity data, so that the apparatus automatically decrements the values that are added by "Cariolis" acceleration. To do this, latitude and velocity are automatically measured using a GPS unit.

It is also useful, if not necessary, to correct for errors derived from drift related to the inertial character of the measuring equipment.

It is known that the values coming from the gyrometers drift over time as a function of temperature and of magnetic field. Therefore, it is necessary to regularly recalibrate the gyrometers, both statically and dynamically.

It is also known that the values provided by the accelerometers drift, with an oscillation of about 84 minutes. This drift is known as "Shuler's law". The accelerometers also drift because of Coriolis acceleration (the "Foucault" effect), which depends on the latitude and the velocity of the moving body.

In order to correct for these errors and for drift of an inertial nature, one should implement, simultaneously, three series of compensation measures:

the first set of measures compensates for the drifts of the gyrometers;

the second set of measures compensates for the drifts of the accelerometers; and the third set of measures compensates for the drifts of the inertial sensing devices.

These three types of corrective measures are described below:

Gyrometers of very high precision, cooperating with gravity sensors, are capable of determining the axis of rotation of the earth, and thus of determining the direction of geographic north and the direction to the earth's center of gravity. In this way, it is possible to reset inertial type sensors automatically.

In order to compensate for "Schuler" drift, measurements are taken from the accelerometers over a period longer than 84 minutes. This initialization time enables one to determine the characteristics of the "Schuler" period for each accelerometer. On the basis of these characteristics and by using an electronic clock, the value of the period is continuously decremented from the results given by the accelerometers.

To compensate for errors due to the "Schuler" and "Coriolis" laws, predictive modeling is used, based upon the use of so-called "Kalman" filters.

To compensate for drift of the inertial sensing unit, a resetting of the unit is performed after a predetermined lapse of time. For this purpose, the initialization terminal (3, in FIG. 1D), serves as the point of reference. The difference between the measured positions and the position of the reference point is determined. This difference is then distributed among all the previous measurements, in order to compensate for measurement errors.

Measurements are taken with the gyrometers and the accelerometers, under various conditions. These measurements are then input into a software program, whose specific function is to model the behavior of gyrometers and is part of the second subsystem (2). The model permits the correction of errors, in real time.

Data acquisition from auxiliary sensors (measurements of the earth's magnetic flux, GPS measurements, measurements supplied by the inclinometers) permits the correlation, in real time or later, of data relating to trajectory (t in FIG. 2).

In a preferred method of utilization, the system (1') is capable of interfacing with auxiliary positioning systems, such as:

Information coming from odometers is utilized, if the video camera (10') is used on a vehicle equipped with an odometer. Information derived from a rotary laser may be utilized. Three optical reference targets, similar to the initialization reference point (3 in FIG. 1D), are installed around the area to be modeled. The laser identifies them several times per second. It can thus determine its position. This measurement is accurate over areas of several tens of meters. This permits the correction of measurements from the inertial sensing unit. A locating system based upon a trihedron generating an electromagnetic or an electrostatic field may be added.

It may also be necessary to correctly manage redundancies of errors and/or redundancies of information.

All the methods seeking to provide additional information can be combined. In fact, information redundancies are most advantageous for increasing the amount and accuracy of available information and thus permitting the establishment of correlations.

In order to best utilize such redundancies, it is helpful to use conventional "gradient decent" or "quadratic programming" types of algorithms (such as the type proposed by Karmaker, or the More and Toraldo type, or the Markhov model type, etc.) so as to obtain near-certain values for each parameter, despite errors of measurement. These algorithms also serve to eliminate aberrant values and to reconstitute missing values.

These methods are well known and are particularly well explained in:

"Numerical Recipes in C++", in: The Art of Scientific Computing, William H Press, Saul A. Teukolsky, Brian P. Flannert and William T. Vetterling, eds., January, 2002.

Finally, another problem to be resolved relates to the shaking of the video camera (10').

This increases the difficulty of making accurate localization measurements, when the video camera (10') is hand held by the operator (OP in FIG. 1B). In effect, this method of operation introduces "noise" in the measurements. Studies have shown that this noise due to camera shaking generally occurs at a frequency in the region of 10 Hz.

Therefore, it is useful to incorporate a "deadening unit" to adjust for sudden and/or frequent variations in trajectory (t in FIG. 2) measurements, as well as shocks.

It is known that accelerometers are most accurate within a certain range of acceleration and frequency. Therefore, it is desirable to amortize the variations in trajectory (t) that fall outside this range of predilection. This method of operation allows one to optimize the measurements coming from the accelerometers. Another advantage is that it smoothes the curve of the trajectory followed by the video camera (10') and thus diminishes the effect of noise contaminating the measurements.

A means of obtaining this effect is to stabilize the video camera (10') and the case of the first subsystem (11'), containing the gyrometers and accelerometers using shock-absorbers (not shown in FIG. 1B).

Step 4 (block 54): data acquisition.

This step consists of acquiring all necessary information and then insuring that all the data is "time-stamped".

These data concern primarily:

capturing a stream of data from the inertial sensing unit; and storing, within a temporary folder, data concerning the increments in rotation $\Delta\theta_x$, $\Delta\theta_y$ and $\Delta\theta_z$, along the axes of each of the three gyrometers, as well as the increments in translation $\Delta\theta_x$, $\Delta\theta_y$ and $\Delta\theta_z$, along the axes of each of the three accelerometers at a frequency of 100 Hz, as indicated previously; and data on the focal length used.

Optionally, one may record other sorts of data, such as:

data, at a frequency of 10 Hz, coming from the two inclinometers;

data concerning absolute position, coming, at a frequncy of 5 Hz, from a GPS unit;

laser telemetry data, at a frequency of 1000 Hz;

data, at a frequency of 1 Hz, from internal temperature sensors;

asynchronous recordings of sound sequences; "time-stamped" data generated by the tri-flux magnetometers, synchronized with the images taken by the video camera (10');

data generated by ultrasonic position measuring devices;

data concerning various optical parameters: focal length, picture-taking speed (exposure time for each image) and focusing distance of the video camera (10'), these data being synchronized with each image taken; and recordings of commands given by the operator.

Step 5 (block 55): improving image localization measurements by image analysis:

Localization of the position of the video camera (10') by image analysis essentially serves to corroborate and fine-tune the measurements derived from the gyrometers and accelerometers.

One processes the redundant data using "descending gradient" or "quadratic" algorithms, cited above, which provide near-certain values for the desired parameters, in spite of measurement errors. These algorithms permit the elimination of aberrant values and the reconstitution of missing values, as discussed previously.

In the preferred utilization mode, one also uses "remarkable points" and implements the "point tracking" technique.

In effect, the localization of camera positions may be refined by the selection of "reference points" on each image. These points of reference are called the "remarkable points" of a subject for computer modeling, which one then identifies on a maximum number of images. The analysis of these "remarkable points" permits the calculation of camera positions.

The technique called "point tracking" in used to locate these "remarkable points" in a series of images, since the images have been filmed as part of a single video or video sequence, in which the images follow one another. Point tracking is a well known software method for image analysis, which permits the automatic following of one or more image points, of the same type, of a subject throughout a video sequence, in which the images follow one another. It is known that this technique is presently a subject for study and for industrial implementation. Nonetheless, its reliability has often been called into question, because of certain problems, especially when the remarkable points are not sufficiently different from adjacent points. This technique is rendered much more reliable and easier to use, when the methods of the invention are implemented, because, in that case, one already knows the characteristics of the image (e.g., the coordinates of the image focal plane) with some precision, from the physical parameters already defined. As a result, the software need "search" only within a well defined region of the image.

A substantial number of softwares are known which will perform this type of analysis and this "tracking" method is a help in localizing images. It permits the automatic analysis of a large number of reference points. It is evident that the greater the number of reference points the greater the degree of refinement in image localization measurements that is obtained.

As a practical matter, in order to assure optimum measurement of trajectory, one adds a laser telemetry device (not shown) to the video camera (10') and/or to the first subsystem (11') which is coupled to it, in order to measure the distance between a particular point and the object to be modeled. This point, whose distance is now known, is automatically taken as being a remarkable point. It is therefore a point that is followed by "tracking". Analyzing curves displaying the positions of these reference points over time makes it possible to accurately determine the motion of the reference points relative to the video camera (10'). If the modeling is being performed within a stationary space, it becomes very easy to determine the movements of the video camera (10'), itself. In this way, it is possible to correct the measurements provided by by the gyrometers and accelerometers of the first subsystem (11').

One may also use optical targets as points of reference.

One powerful technique for obtaining points of reference on images is to install optical targets around the subject to be modeled. These targets are equipped with light emitting diodes. Their positions on the images may then be recognized automatically.

Step 6 (block 56): data synchronization.

The inertial sensing unit within the primary subsystem (11') transmits its data at a frequency of several hundred Hertz. The problem is to synchronize the data concerning the position of the video camera (10') transmitted by that unit with the filmed images, the goal being to characterize the images with respect to the position of the video camera (10') at the moment they are filmed.

It should be noted that certain video cameras can transmit, digitally and in real time, data concerning sound synchronization, the position of the focal plane (which is an extremely important, if not essential, parameter), the type of film, light measurements, etc., data which should also be synchronized with respect to the position data.

Several different solutions to the synchronization problem could be adopted using the invention, among which are the three that follow:

Solution 1: Images-position synchronization can be done by using the traditional images-sound synchronization method utilized by the movie industry. One films a hand-clap. Then one "pastes" the film frame where the clapping hands come together to the moment on the sound track where one hears the sound of the clap.

The second subsystem (2) contains a microphone (23 in FIG. 1B). One synchronizes the position data stream with the sound, which has been recorded simultaneously. Then one need only find the sound of the hand clap on the sound track to complete the synchronization of the images with the positional data stream.

Solution 2: The video camera (10') contains circuits which generate an output signal indicating the moment at which the operator (OP) begins to record a new sequence of images. This signal is received by the microprocessor (4) of the second subsystem (2) and the recording of positional data is initiated immediately.

Solution 3: One can attach a small, auxiliary video camera (100'), light-weight and of low definition, to the primary video camera (10') or to the first subsystem (11'). In this case, the recording of the images and of the position data stream is simultaneous. The direction of the objective of the auxiliary video camera (100') is the same as that of the primary video camera (10'). As a result, the little video camera (100') films the same scenes with the same positions. It suffices, then, to superimpose the two image streams to synchronize the images from the primary video camera (10') with the data stream.

Step 7 (block 7): data storage

The images taken by the video camera (10') are characterized by the six coordinates of position, but also with respect to the following parameters:

the physical configuration of the system (1');
time-stamping: the precise time at which the images were captured;
movement: acceleration, velocity and trajectory
focal length of the video camera (10'): type of focal length used or zoom position, if used;
position to which focusing distance is set;
picture-taking speed: exposure time for each image;
lens aperture during filming;
ambient brightness, while filming in one or more zones;
ambient temperature;
estimates of measurement errors in data from the gyrometers and accelerometers;
sound files; and
video files These data are integrated into a database stored on the hard drive (403) of the data processing unit (4) of the second subsystem (2).

Step 8 (block 58): subsequent analysis of the characterized images.

The operator (OP) may, at his/her leisure, exploit the data base of characterized images in order to modify them a posteriori.

As has been mentioned previously, the invention has multiple and varied applications, notably the following:

Application 1: In the film special effects industry, there is often a need to imbed synthetic images into images filmed with a camera in motion. If one knows, with precision, the spatial coordinates of each image and the focal length employed, it becomes easy to fit the synthetic images into the various images of the film, which is exactly what the processes of the invention permit. The coordinates of the focal plane (FP) of an image (I in FIG. 2) are, as previously defined:
the inclination of the focal plane in space: the angles of elevation, $\alpha_i$, azimuth, $\beta_i$, and roll $\gamma_i$; and
the position of the center of the image (C): the coordinates being $x_i$, $y_i$ et $z_i$.

Application 2: Films photographed with shoulder-held cameras may be subject to sudden variations in trajectory, as well as to shocks and/or vibrations. Knowing the image positions may serve to smooth out an image sequence, especially thanks to the use of existing image interpolation software. Again, the use of the invention permits this goal to be attained.

Application 3: To give slow motion effects without having jerky images, the special effects industry uses special software to create "virtual" images between two succesive images that have been actually filmed. Knowing the trajectory of the focal plane, as the use of the invention allows, makes this interpolation of images rapid and reliable.

Application 4: A traditional cinema trick involves superimposing images. A classic example is to film one person, then to film the same person in a different place in the scene and, finally, to superimpose the two images. The person who has been filmed appears to be in two places at once. This effect, which is relatively easy to accomplish when the image planes are stationary, becomes much more difficult when they are in motion. It is then necessary to synchronize the two image sequences in which the image planes cover the same areas, and this is exactly what the invention permits one to do.

Applying a second method of using the invention, the invention also permits navigation within a three-dimensional universe, in real time.

The steps for utilizing the invention in its second mode are similar, if not identical, to those just described for the first mode, at least as far as the first four steps are concerned. One then moves on to the step arbitrarily called "Step 9" in the block diagram of FIG. 3, even though this step, in reality, follows the fourth step, as will be explained later.

Be that as it may, the important thing here is to obtain positional data in real time. These data are provided at a frequency of 100 Hz.

Step 9 (block 59): obtaining a "pointer" in three-dimensional space in order to navigate in a virtual universe.

The data relative to the position of the video camera (10'), the images taken, as well as the focal length utilized are transmitted, in real time, to the second subsystem (2), more precisely, to the data processing unit (4) via an appropriate connection (112'): wire cable, optical or wave connection.

The data processing unit, using stored software programs, contains software for three dimensional representation, which operates in real time. One could use one of the commercially available software programs, such as "Director" distributed by the Macromedia Company or "3DS max" distributed by a company called Discret (both names are registered trademarks).

This second mode of utilization of the invention finds application in the following situation (the list is not exhaustive):

The scenes of a film are increasingly composed of synthetic images, in all or in part. Under these conditions, it often becomes difficult to select the exact framing of the video camera (10'), especially when it is in motion. It then becomes necessary to visualize, in real time, an outline of the framing of the video camera (10') within a virtual decor. One makes the assumption, here, that this three-dimensional decor has already been modeled. When the positional coordinates and the focal length of the video camera (10') are known, in real time, the virtual image of the framing may be reconstituted, in real time, by software for three-dimensional representation.

Having read the preceding, one can easily ascertain that the invention attains its goals.

Nonetheless, it should be clear that use of the invention is not limited to only those particular applications described explicitly, in particular with reference to FIGS. 1A through 3.

Similarly, the choice of individual components or modules depends upon technological factors best left to the determination of the professional and have not been specified exactly, in order to better describe the overall technical characteristics of the invention.

It must be remembered that the invention's usefulness is by to means limited to those applications specifically described.

The invention claimed is:

1. A method of embedding images from other sources within images captured by a viewing device in motion, by transmitting and analyzing the spatial coordinates of the viewing device during acquisition of a sequence of video images (I) while the viewing device is moving through space along a trajectory (t) determined with respect to a defined reference point, the method comprising:
   a preliminary step consisting of attaching said viewing device to a first subsystem which contains an inertial sensing unit delivering data signals representing spatial coordinates and instantaneous inclination and the focal length of said viewing device with respect to said defined reference point, wherein the first subsystem is removable from the viewing device;
   a first step of acquiring, in real time, of said data signals during the movement of said viewing device along said trajectory (t) and the transmitting of said data signals to a second subsystem which includes equipment for processing said data signals using a stored software program; and
   a second step of processing said data signals, either in real time or deferred for later analysis, so as to determine said spatial coordinates of the viewing device, and improving the quality of the acquired data signals by applying an image analysis procedure, wherein error corrections to the data signals delivered by said inertial sensing unit is done by applying the image analysis procedure, included among the stored software program contained in a data processing unit.

2. The method, according to claim 1, wherein said spatial coordinates represent the position of said viewing device along said trajectory (t) in relation to the axes of an orthonormal trihedron of reference (XYZ) and the instantaneous inclination represents the angles of azimuth, elevation and roll around an axis of said viewing device, said axis intersecting the center (C) of the focal plane (FP) of said sequence of video images (I).

3. The method, according to claim 1, wherein, during a supplementary preliminary step, said inertial sensing unit is initialized and standardized with respect to a reference point of origin.

4. The method of claim 1, wherein the integration of the focal planes (FP) of the sequence of video images (I) is obtained by acquiring data identifying the focal length used by said viewing device and by acquiring, in real time, the data signals representing the spatial coordinates and the instantaneous inclination and the focal length of said viewing device.

5. The method according to claim 1, wherein the data signals are used in a manner so as to visualize, in real time, the images captured by said viewing device into a preexisting three-dimensional virtual decor by using software for three dimensional reconstitution.

6. A method of claim 1, wherein connecting devices are included for transmitting the data signals from the first subsystem to the second subsystem.

7. The method of claim 1, wherein the viewing device is a video camera.

8. The method of claim 1, wherein the inertial sensing unit includes at least one gyrometer and one accelerometer with three distinct, non-coplanar axes.

9. The method of claim 8, wherein in order to improve the determination of spatial coordinates of the viewing device and to improve the synchronization between the acquired data signals and the sequence of video images (I) obtained comprises at least one of the following components:

a tri-flux rotary magnetometer;
two inclinometers, orthogonal with respect to each other;
a satellite localization device of the "GPS" type;
an electronic localization device, using either electromagnetic or electrostatic fields;
a magnetometer of one or several fluxes, either static or dynamic;
an odometer;
a temperature sensor;
a precision quartz timer;
an auxiliary video camera, attached to said first subsystem, and
a microphone.

10. The method of claim 1, further comprising a supplementary preliminary step consists of storing said acquired data signals within a hard drive data storage module of said data processing unit.

* * * * *